Dec. 31, 1968          M. K. BRAND          3,418,882

KEY MAKING MACHINE FOR TUBULAR-TYPE KEY

Filed Sept. 2, 1966                                    Sheet 1 of 3

MAX K. BRAND
INVENTOR.

BY

Tom Sherrard, atty

MAX K. BRAND
INVENTOR.

BY

Tom Sherrard, atty.

Dec. 31, 1968  M. K. BRAND  3,418,882
KEY MAKING MACHINE FOR TUBULAR-TYPE KEY
Filed Sept. 2, 1966  Sheet 3 of 3

MAX K. BRAND
INVENTOR.

BY

Tom Sherrard, atty

United States Patent Office 3,418,882
Patented Dec. 31, 1968

3,418,882
KEY MAKING MACHINE FOR
TUBULAR-TYPE KEY
Max K. Brand, P.O. Box 3531, San Diego, Calif. 92103
Filed Sept. 2, 1966, Ser. No. 576,924
4 Claims. (Cl. 90—13.05)

ABSTRACT OF THE DISCLOSURE

This provides a device for manufacturing barrel keys from blank tubular key stock. The device includes a cutting means which is movable in a direction parallel to the center axis of the key stock which is held in a cutting position. When moved in the parallel direction, the cutting means forms recesses around the outside circumference of said stock at one end thereof. The cutting means is mounted to move in a radial direction with respect to the center axis of the tubular key stock. The device includes aligning means for adjusting the radially movable cutting means an effective radial distance from the center axis of the key stock to thereby accommodate various diametric sizes of key stock.

SUMMARY OF THE INVENTION

An object of my invention is to provide a machine for keys of the above type regardless of the diameter of the tubular portion thereof.

Another object of my invention is to provide such a machine for making keys which have various space relationships among the recesses and index stud on the outside diameter of such tubular portions.

A still further object is to provide a means for changing from the manufacture of a key of one size to the manufacture of a key of another size in a simple, quick and easy manner.

As is well known in the trade, the unique portion of some keys is cylindrical in shape with the inner portions barreled-out. Such tubular shaped keys are commonly known as the "Chicago ace keys." These keys are frequently used for locks on laundromats and canteens. As distinguished from the more conventional straight edged key, the keys which can be made on my machine operate with recesses arranged in a circular manner around the end of a tubular portion. Only my machine can accommodate such keys of various diameters and variously spaced recesses.

BRIEF DESCRIPTION OF DRAWINGS

For other objects and for a better understanding of the invention, reference may be had to the following detailed description taken in connection with the accompanying drawing in which.

DESCRIPTION OF SPECIFIC EMBODIMENTS

Figure 1:
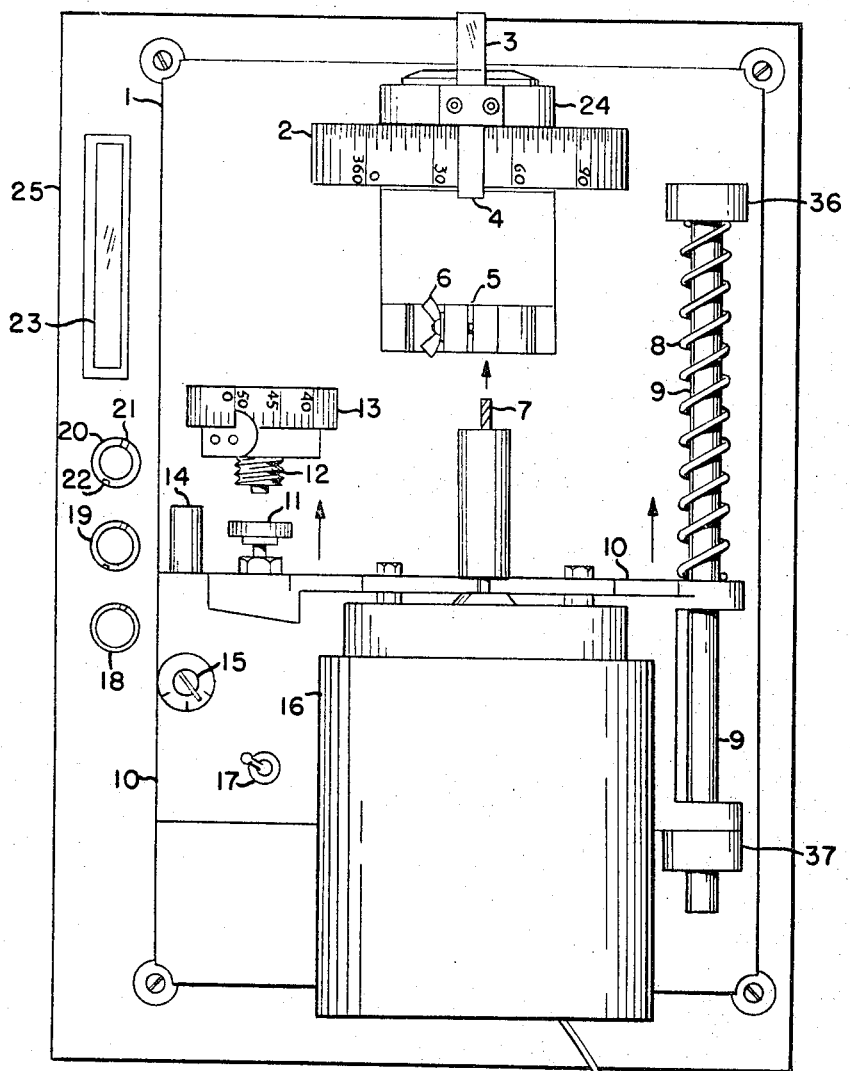
FIGURE 1 is a top plan view of my entire invention.

Referring to the drawings showing the preferred structure of my novel concepts the number 7 is a conventional end mill of the preferred size of 3/16 inch. It is preferably driven by an electric motor 16. For eliminating end play the use of a ball bearing motor is the simplest. The end mill may be secured to the motor by a conventional check. The motor is slidably mounted on two parallel cylindrical rods 14 and 9. As is best illustrated in FIGURE 1, a spiral spring 8 works against motor mount 10 tending to keep it away from the stock. Mount 10 is secured to rod 9. The rod 9 slides horizontally in bosses 36 and 37.

An important new feature of my assembly involves a means for positioning the end mill 7 in alignment with the outside circumference of the key stock barrel regardless of the diameter of the barrel. This is accomplished by threaded shaft 15. By vertical passage through mount 10 this shaft supports the operating heighth of the motor, and thus end mill 7. A marking system (FIGURE 1) at one end and rest 35 for abutment with rod 14 or other fixed base portion completes this item.

Rods 9 and 14 are appropriately positioned on a plate 1. This in turn may be secured to a base block 25.

Figure 2:
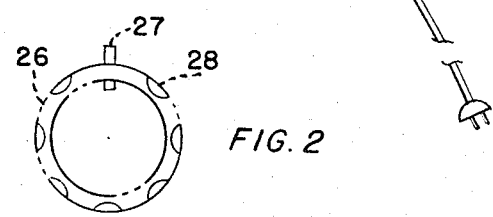
FIGURE 2 is a view of the tubular end of a key which can be made on my machine.
Figure 3:
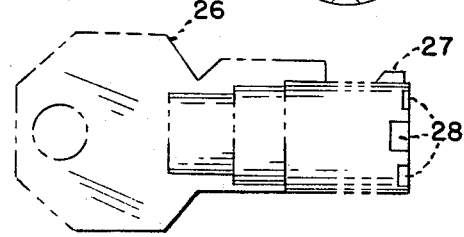
FIGURE 3 is a side elevation of such key.

A critical need in the manufacture of tubular keys is that of spacing recesses 28 around the circumference of the end of the key. All such keys are not the same in this respect. Each blank key (herein called "key stock") is, however, manufactured with a stud 27. This may serve as a guide or index point for correct positioning of the recess around the barrel end of the blank key stock. Illustrations of FIGURE 2 and FIGURE 3 show this described member. Recesses are usually seven in number. They are currently evenly spaced around the barrel. They vary, however, in their distance from the stud 27.

Figure 4:
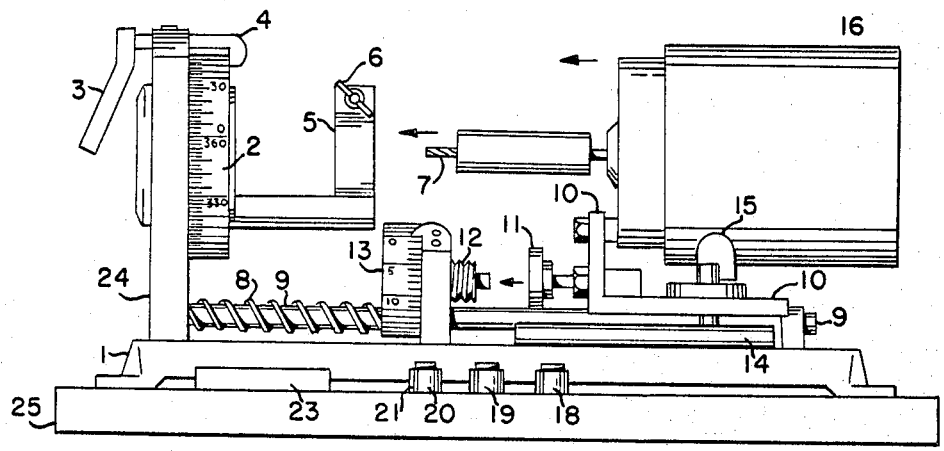
FIGURE 4 is a side elevation of the entire assembly constituting my invention.
Figure 5:
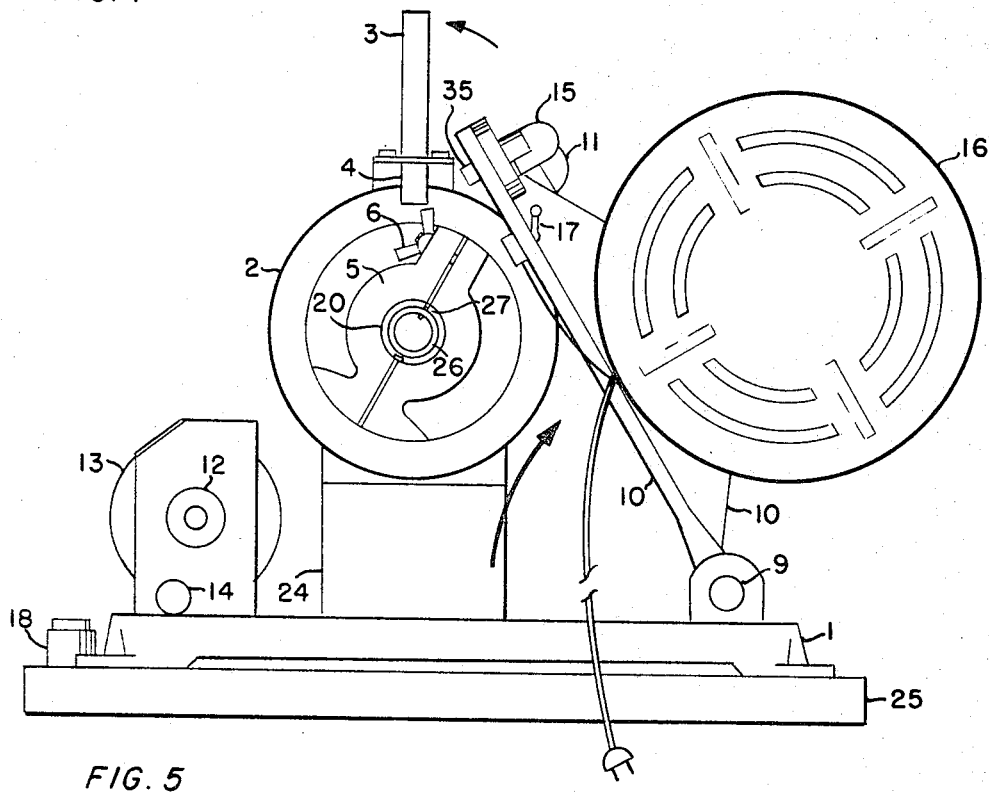
FIGURE 5 is an end view of such assembly with the power source out of line with the stock.

Since all tubular portions on the key stock are not of the same diameter, I have provided a plurality of sleeves for adapting all of them to my novel device. The sleeves are alike in all respects except the inside diameters. They may be retained, when not in use, on bosses provided therefor on block 25. See FIGURE 4. For currently manufactured keys I find that three different size sleeves are sufficient. For key stock of smallest barrels, sleeve 18 is used; for larger barrels sleeve 19 is used and sleeve 20 accommodates key stock of the largest diameters. Each sleeve has slots 21 and 22 to permit tightening and loosening when in use and to accommodate boss 27.

To retain the key stock and its sleeve for cutting, I have provided a simple chuck 5 with wing nut 6 for securing stock in position. As a novel feature, this retaining assembly is integrated with calibrated drum 2. The calibrations are preferably marked to indicate the 360 degrees of a circle. Vertical standard 24 is stationed on plate 1. It is journaled to retain a portion of the chuck and calibrated portion assembly for rotation as a unit. Lock 4 and handle thereon 3 secure the assembly in any desired fixed position.

Next, attention is directed to my novel means for cutting recesses 28 to prescribed depths. I provide a relatively short support parallel to standard 24. It is also secured to plate 1. This support is provided with inside diameter threads for threaded engagement with screw 12. A calibrated head 13 is formed at one end of screw 12 and a flat projection is at the opposite end. Oppositely disposed thereto is a suitable projection 11. It is adjustably secured to mount 10 as illustrated. Whole numbers representing thousandths of an inch are provided as markings on the head. For example, the number "48" may represent .048 inch.

Figure 6:
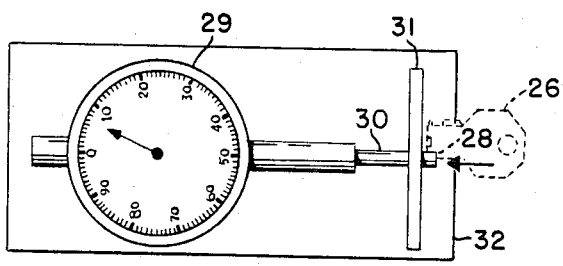
FIGURE 6 is a detail of the preferred decoder portion of my novel combination viewed from the top thereof.

Since manufacturing data is not always directly available, I have devised a decoding member for use with the described parts. The preferred form of such member includes a dial 29 of FIGURE 6. The hand thereof is activated by the sliding of shaft 30 in a cam like engagement with the shoulders of the recesses in model key 26. A butting surface 31 may serve as both a stop for the end of the model key and a support through which the shaft slides. It and the dial element may be affixed to a support structure 32. The numbers on the dial are, like the numbers on head 13, scaled to a thousandths of an inch.

Figure 8:
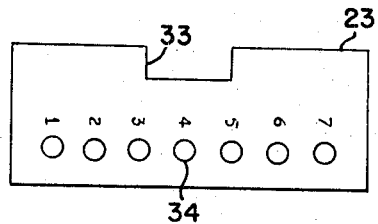
FIGURE 8 is a detail of a modification of such decoder portion viewed from the top thereof.
Figure 7:
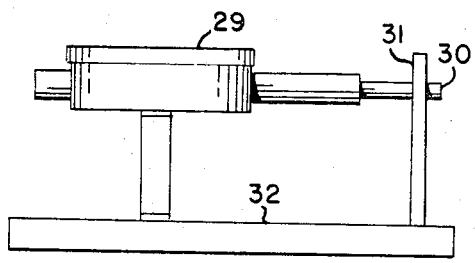
FIGURE 7 is a side elevation of said preferred decoder portion.
Figure 9:
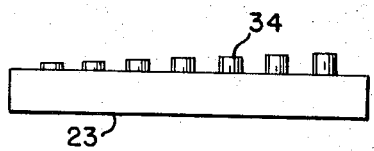
FIGURE 9 is a side elevation of said modification.

An alternate form of my decoding member comprises depth block 23 with a plurality of vertical pins 34. Each pin is of a specified length. This corresponds to the standard depth of recesses in model key. The length may be read directly from the block or it may be provided on a separate chart. Key numbers (see FIGURE 8) may correlate the pins and chart.

Figure 11:
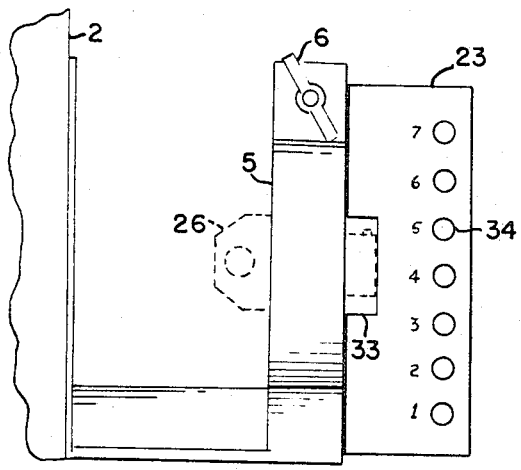
FIGURE 11 is a side elevation detail showing a portion of the block decoder being used as a depth guage.

A cut-away section may be machined out of block 23 to serve as a uniform depth guide in positioning key stock in chuck 5. FIGURE 11 is a detail on this.

When not in use this alternate decoder may rest in a well provided therefor in block 25.

Having described my invention, the operation thereof is as follows:

First, assuming factory code information is not at hand, the model key, which is to be duplicated, is decoded. This is done by placing the end of the model key against surface of bar 31 with the end of shaft 30 against the shoulder of recess 28. The resulting force on the shaft causes the dial hand to point to a number. This number is recorded as the depth for the first cut. The first recess measured may be recorded as the closest to stud 27. Exact order as that on model key must be maintained. If the alternate block 23 is used, the pins 34 serve as depth gauges when the recesses are aligned therewith. All recesses on the model key are thusly decoded.

Figure 10:
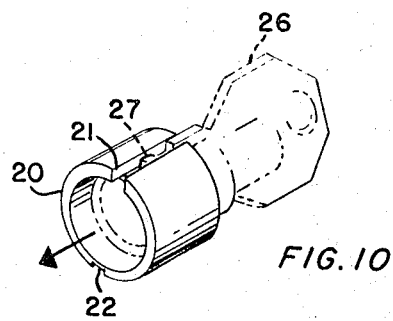
FIGURE 10 is a perspective view of an adapter.

Next, the position of the recesses in respect to stud 27 are noted. From charted information or measurement, the degree of each recess from stud 27 is observed. An appropriate sleeve for snug fitting with the barrel portion of the key stock is slid onto the key stock as shown in FIGURE 10. The sleeve and key stock are placed in chuck 5. The key stock must extend beyond the distance of any recess to be cut. For any particular size key the distance must be uniform. When using the alternate decoder the extension is guaged by the cut away section 33. Reference is to FIGURE 11 of the drawings. Thereafter nut 6 is tightened to secure the stock in the chuck.

The end mill, motor and mount having been swung in the direction of the large arrow in FIGURE 11, are now lowered. Set handle-marker of shaft 15 to correct mark for particular key barrel. This positions end mill the proper distance from center of the circular cross section of the key stock. As the diameter of the barrel varies, so will the setting of item 15.

Charted or measured information from the model key next indicates the setting for drum 2. In this manner the recess will be in the same position as the recess of the model key in respect to stud 27. Now the operator locks the chuck by turning handle 3.

Thereafter head 13 is turned to the effective number corresponding to the information received from the described decoder.

Lastly, switch 17 is turned on and the end mill revolves. The motor assembly is manually moved in the direction of the arrows. When the screw 12 is abutted by projection 11 the complete cut has been made.

The motor and mill are allowed to return to position away from the stock. Lock 4 is released. Drum 2 is rotated to the next position, according to the model key or information; head 13 is rotated to a number signaling the depth of the next recess, and the next cut is made. In a similar manner all the cuts are made.

Although the preferred embodiment of my invention is shown and described it will be apparent that one skilled in the art can make modifications which will fall within the scope of my subjoined claims.

I claim:

1. In a device for manufacturing barrel keys from blank tubular key stock, the combination comprising:
   (a) means mounting said tubular key stock in a cutting position,
   (b) cutting means to form recesses around the outside circumference of said stock at one end thereof,
   (c) said cutting means mounted to move in a radial direction with respect to the center axis of the tubular key stock,
   (d) aligning means for adjusting and setting the cutting means at an effective radial distance from the center axis of the key stock to accommodate various diametric sizes of key stock in said device, and
   (e) a power source to drive the said cutting means.

2. A device as defined in claim 1 wherein
said cutting means is movable in a direction parallel to the center axis of the key stock and further including
adjustable limiting means to control the movement of the cutting means in the direction parallel to the center axis of the key stock.

3. A device as defined in claim 1 wherein
said key stock mounting means includes a rotatable member connected to the stock to rotate the stock for cutting recesses at different locations around the said outside circumference.

4. A device as defined in claim 2 wherein
said key stock mounting means includes a rotatable member connected to the stock to rotate the stock for cutting recesses at different locations around the said outside circumference,
said rotatable member has calibrations for maintaining close tolerances in the adjustment of the tubular stock to the different circumferential locations, and
said adjustable limiting means has calibrations for maintaining close tolerances in the adjustment of the cutting means in the formation of the recesses at the end of the said stock.

References Cited

UNITED STATES PATENTS

| | | | |
|---|---|---|---|
| 1,254,442 | 1/1918 | Smith | 90—13.05 |
| 1,978,009 | 10/1934 | Caron | 90—13.05 |
| 2,129,037 | 9/1938 | George et al. | 90—13.05 |
| 3,148,589 | 9/1964 | Le Fever | 90—13.05 |

GERALD A. DOST, *Primary Examiner.*